INVENTOR.
ALEXANDER G. MENTES

Feb. 21, 1967   A. G. MENTES   3,304,845
SPREADER WITH AGGREGATE SPREADING AND REMIXING MEANS
Filed Jan. 17, 1966   4 Sheets-Sheet 3

FIG. 3

INVENTOR.
ALEXANDER G. MENTES

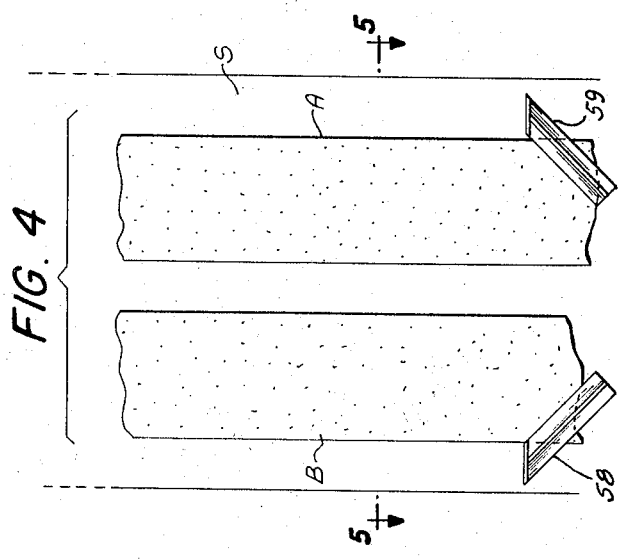
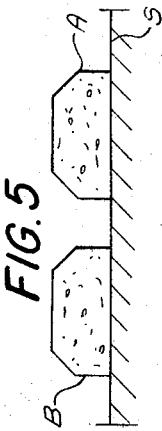
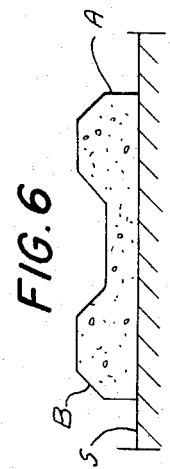
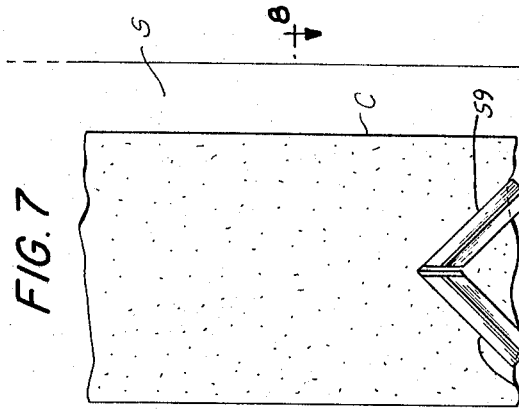
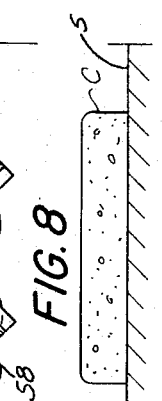
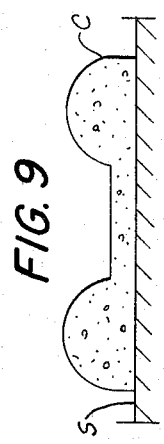
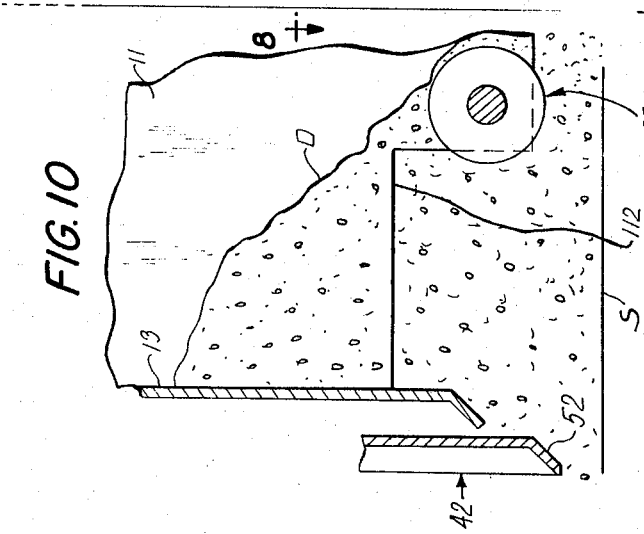

United States Patent Office 3,304,845
Patented Feb. 21, 1967

3,304,845
SPREADER WITH AGGREGATE SPREADING
AND REMIXING MEANS
Alexander G. Mentes, 630 Terrace Ave.,
Hasbrouck Heights, N.J. 07604
Filed Jan. 17, 1966, Ser. No. 530,756
1 Claim. (Cl. 94—44)

This invention relates to spreaders for spreading loose aggregate as a base for roadways, parking lots, aircraft runways and the like and the invention has particular reference to a spreader for remixing the aggregate with the forward movement thereof. The application is a continuation-in-part of my application Serial No. 285,439, filed June 4, 1963, now abandoned.

The invention comprehends the laying of aggregate on the base of roadways and the like in at least one windrow which is of narrower width than the roadway and is plowed to spread the aggregate into a longitudinally extending heaped area at each side edge and a longitudinally extending area of lesser depth therebetween and which is then subjected to the action of rotary motion to effect a substantially homogeneous intermixing of the different sized particles and finally spreading the remixed aggregate to the full width of the roadway and at a uniform depth.

Broken stone for use in roadways and the like termed aggregate is made up of various sizes of stone particles so as to obtain maximum mechanical interlocking thereof to provide a stable foundation or base for the roadway and the like. Before the mixed stone particles are spread onto the subgrade for the roadway or the like, repeated handling thereof is required such as dumping the same onto a hauling truck, travelling of the truck over rough roads, and the dumping thereof from the truck onto the subgrade, which repeated handling causes the larger stone particles to concentrate towards the outer edges of the loads and the heaps deposited by the trucks. In order to remix the various sized stone particles to provide a substantially consistent intermixing thereof, spreaders have been provided with appropriately spaced baffles which with the forward movement of the spreader are pushed into the heap of stone particles dumped into the spreader by the hauling truck so as to remix the same within the spreader. This necessitates the stopping of the spreader for each truck load so that the truck can be backed into position in front of the spreader for dumping the load therein. The present invention contemplates the dumping of the stone particles in windrows upon a long stretch of the subgrade in advance of and of lesser width than the spreader and which with the forward movement thereof functions to spread the stone particles to the approximate depth and width as to grade and cross-section and actively remix the various sizes and segregated particles into a substantially homogeneous intermixing thereof.

Another object of the invention is to provide a spreader with means for loosening up the heaps or piles deposited on the subgrade in windrows by the hauling trucks and for spreading and remixing the same into the proper consistency of the various size particles over the desired area in depth and width.

Another object of the invention is to provide a spreader having a plow and a rotatable screw for spreading and remixing the variously sized stone particles with the forward movement of the spreader to obtain a more homogeneous mixture thereof.

Still another object of the invention is to provide a plow which is adjustable vertically and laterally for spreading the broken stone in the windrows into a longitudinally extending heaped area along each side edge and a longitudinally extending area of lesser depth therebetween.

The invention further provides a spreader which includes a container having an open bottom, a plow for spreading the broken stone in advance of the container, a screw for spreading and remixing the broken stone which is located rearwardly of the plow and in front of a strike-off plate which is adjustable in elevation to permit of the discharge of the desired depth of broken stone or aggregate from the container. With the forward movement of the spreader the plow is pushed into the broken stone deposited by the trucks on the subgrade for the roadway and the like and which plow is adjustable laterally and in elevation for spreading the heaps of broken stone the desired width within the spreader. The stone so spread by the plow is engaged by the screw which functions to remix the same and continue the spreading thereof in advance of the strike-off plate which is adjustable in elevation to permit of the discharge of the desired depth and cross-section of the broken stone or aggregate and which also functions to level the top thereof.

With the aforegoing and other objects in view, reference is now made to the following specification and accompanying drawings in which the preferred embodiment of the invention is illustrated.

In the drawings:

FIG. 3 is a longitudinal sectional view taken approximately on line 3—3 of FIG. 2.

FIG. 4 is a schematic plan view of one arrangement of windrows of aggregate deposited by the trucks on the subgrade in advance of the spreader.

FIG. 5 is a sectional view taken approximately on line 5—5 of FIG. 4.

FIG. 6 is a sectional view similar to FIG. 5 but showing the cross-sectional formation of the windrows when acted upon by the plow.

FIG. 7 is a schematic plan view of another arrangement of windrow of aggregate deposited by the trucks on the subgrade in advance of the spreader.

FIG. 8 is a sectional view taken approximately on line 8—8 of FIG. 7.

FIG. 9 is a sectional view similar to FIG. 8 but showing the cross-sectional formation of the windrow when acted upon by the plow.

FIG. 10 is a schematic fragmentary sectional view showing the heaping up of the aggregate against the rear wall of the spreader by means of the screw.

Figure 1:
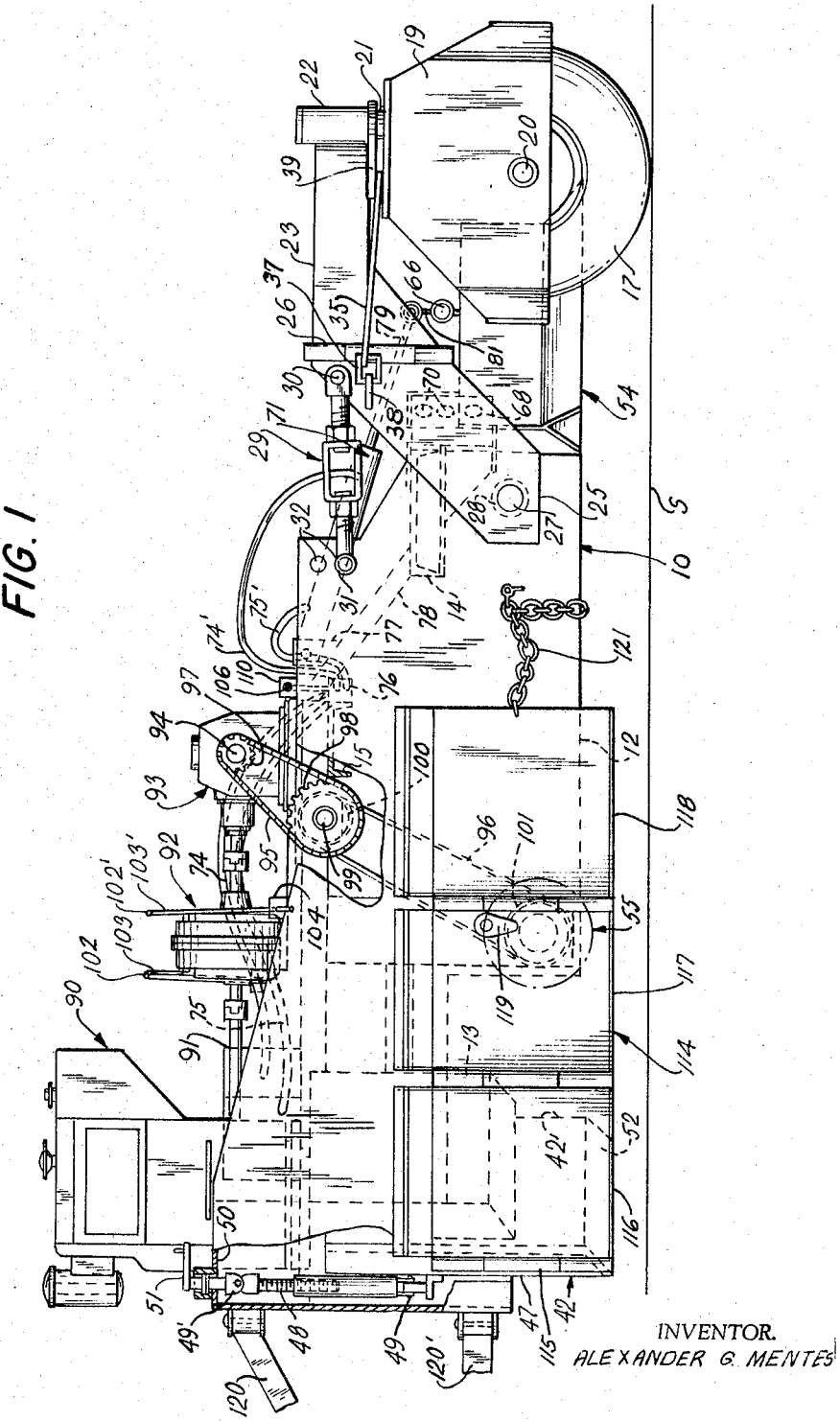
FIG. 1 is a view in side elevation of a spreader constructed in accordance with the invention.

Referring to the drawings, the spreader includes a container 10 having opposite side walls 11 and 12, a rear wall 13 and an open bottom between said side walls. Cross frame members 14, 15 and 16 preferably of channel shaped formation are connected between said side walls.

The spreader is rollably supported at its forward end by wheels 17 which are journaled to wheel mountings having lateral and vertical swinging movements for adjustably disposing the wheels inwardly or outwardly with reference to the side walls respectively and for adjustably varying the elevation of the wheels. The said mountings include housings 19 extending over the upper portions of the wheels respectively and to which the wheels are journaled on shafts 20. The housings are provided with vertical shafts 21 which are journaled in bearings 22 at the forward ends of vertical plates 23 respectively for swinging movement of the housings to the right or left about the shafts 21. The plates 23 are affixed to the bearings 22 and extend rearwardly therefrom and are swingably connected with vertical plates 25 on vertical hinges 26 for swinging movement of the housings laterally to the right or left with reference to the side walls 11 and 12 respectively. The plates 25 extend downwardly from the hinge connections 26 with the lower ends thereof provided with stub shafts 27 which are journaled in sleeves 28 affixed to the side walls 11 and 12 for swinging movement for raising and lowering of the wheel mountings. The wheel mountings are raised and lowered by means of the tightening and loosening of turnbuckles 29 which are pivotally connected with the vertical plates 25 respectively on pivot pins 30 and are connected with the side walls 11 and 12 by pins 31 adapted to selectively engage in any one of the apertures 32.

The housings 19 are retained in set position inwardly or outwardly with reference to the planes of the side walls 11 and 12 respectively by bars 34 and 35 which are arranged on opposite sides of each of the plates 23 and are connected by links 37 to horizontally disposed plates 38 affixed to the vertical plates 25 rearwardly of the hinge connections 26. At their forward ends the bars 34 and 35 are adjustably connected with horizontally disposed plates 39 which are affixed to and extend rearwardly from the bearings 22 respectively and which plates have a plurality of apertures 40 on each side thereof adapted to be selectively engaged by pins 41 extending through the forward ends of said bars. When the housings 19 are disposed outwardly with reference to the planes of the side walls 11 and 12 as shown in FIG. 2 of the drawings, the inner bars 34 are in engagement with the plates 39 and the outer bars 35 are out of engagement therewith and when the housings are swung inwardly with reference to the side walls 11 and 12, the outer bars 35 are in engagement with the plates 39 while the inner bars 34 are out of engagement therewith.

The spreader is provided with a strike-off blade 42 for discharging the desired depth and cross-section of broken stone or aggregate beneath the rear of the spreader with the forward movement thereof. The strike-off blade is guidedly mounted for vertical adjustment between rollers 43 and 43' arranged on opposite sides thereof with the rollers 43 rollably mounted between bars 44 affixed to the rear wall 13 and the rollers 43' rotatably mounted between bars 45 affixed to the crossbar 16. The said blade includes a transversely extending medial portion 46 and oppositely disposed angularly arranged side portions 47 and 47' and is manually raised and lowered by screws 48 connected with said side portions by universal connections 49 and 49' and which screws are swivelly mounted in the top wall 50 and having handle members 51 for manually turning the screws so as to dispose the angulated foot 52 of the blade in the desired spaced relation from the subgrade for discharging the required depth of broken stone or aggregate. The foot 52 rides over the upper surface of the stone or aggregate which is discharged therebelow with the forward movement of the spreader.

The broken stone or aggregate which is to provide the base for roadways, parking lots, aircraft runways and the like, is deposited by hauling trucks in windrows on the subgrade thereof in advance of the spreader. The spreader is moved forwardly by any desired means such as by a tractor pushing the same and in order to provide the required width of base and the proper intermixing of the various sized stone particles, the spreader includes a plow 54 which engages with and spreads the heaps or piles of stone laterally between the side walls 11 and 12 thereof. Rearwardly of the plow the broken stone or aggregate is engaged by a screw 55 having right and left hand screw portions 56 and 57 which spread and remix the various sized broken stone throughout the area of the subgrade between the side walls 11 and 12 to provide a substantially homogeneous mixture within the spreader in advance of the strike-off blade 42.

Figure 2:
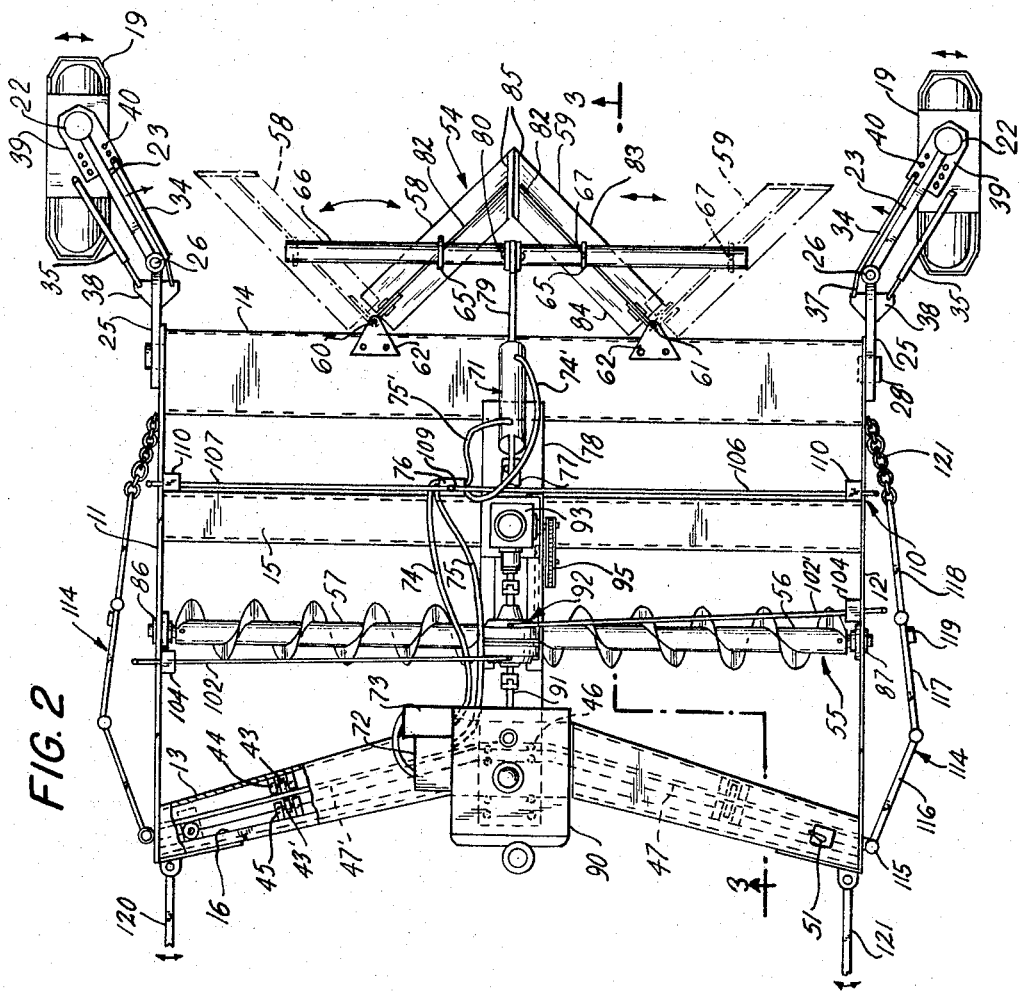
FIG. 2 is a top plan view thereof.

The plow 54 includes oppositely disposed plow sections 58 and 59 having hinge connections 60 and 61 with brackets 62 affixed to and extending forwardly from the cross frame member 14 the hinge connections being detachable from the brackets for lateral swinging movement of said sections from forwardly extending converging relation centrally between the side walls 11 and 12 of the container to forwardly extending diverging relation, the width between the outer ends thereof being narrower than the container as shown in FIG. 2 of the drawings. The plow sections have pivoted studs formed with eyes 65 through which a cross bar 66 slidably engages for guiding the sections for movement from converging to diverging relation and for securing the same in set position by set screws 67 extending through the rims of said eyes and into engagement with said cross bar. The hinge connections 60 and 61 include vertical plates 68 on which the sections are pivotally mounted by pins 69 adapted to selectively engage in vertically spaced apertures 70 therein for selectively disposing the plow sections in variously spaced relation with reference to the subgrade. The plow sections are adapted to be swung about their pivotal connections with the vertical plates 68 for disposing the same in downward directed inclined relation by any desired means such as by a hydraulic ram 71. A centrifugal pump 72 with an oil reservoir tank 73 is operatively connected by conduits 74 and 75 with the opposite ends of said ram through a four-way valve 76 for forcing fluid in one end of said ram for raising the plow and in the opposite end thereof for lowering said plow. The ram is pivotally mounted for vertical swinging movement on a bracket 77 which is affixed to a frame member 78 extending between the rear wall 13 of the container and the cross frame member 14. The outer end of the ram piston 79 is pivotally connected with a link 81 by a pivot pin 80 through which link the cross bar 66 extends for swinging movement. It will be understood that the valve 76 may be set in a neutral position to permit of the free inward and outward movement of the ram piston 79. When the valve 76 is in this position the plow sections 58 and 59 may be swung from converging relation to diverging relation and vice versa, the cross bar 66 moving with the ram piston thus prevents binding of the eyes 65 of the studs and permits the free sliding thereof along the cross bar with the swinging movement of the plow sections on the rearward pivots.

Each of the plow sections 58 and 59 includes an upstanding plate 82 having oppositely disposed bottom flanges 83 and 84 extending downwardly in angular relation therewith. End plates 85 are provided on the forward ends of said sections which abut when the sections are in forwardly directed conveying relation.

The screw 55 extends transversely of the container and is journaled at its outer ends in bearings 86 and 87 in the side walls 11 and 12 respectively. The screw is also journaled intermediate the right and left hand screw portions 56 and 57 in a bearing 88 mounted in a bracket 89 depending from the frame member 78. The screw is rotated by any desired means and, as illustrated, is operatively connected with an internal combustion engine 90 mounted in fixed position on the frame member 78. The drive shaft 91 of the engine is connected with a reversible clutch transmission 92 and with a bevel transmission 93 and which clutch and bevel transmissions are mounted in fixed position on said frame member 78. The output shaft 94 of the bevel transmission is connected with the screw 55 by endless chains 95 and 96. The chain 95 engages over a gear 97 mounted on the output shaft 94 and over a relatively larger gear 98 mounted on a stub shaft 99 journaled in a bearing in said frame member 78. The endless chain 96 operates over a gear 100 mounted on said stub shaft 99 and over a gear 101 affixed to the screw 55 adjacent the bearing 88.

The screw 55 is adapted to be placed in operation to rotate in either directions for spreading and remixing the aggregate between the side walls 11 and 12 and for remixing the larger particles which tend to gravitate outwardly by rotating the screw in a counterclockwise direction as viewed from the side wall 12 in FIG. 1 of the drawings. The reversing clutch mechanism 92 is adapted to be manually placed in clutching engagement with the drive shaft 91 of the motor from either side of the spreader by means of actuator rods 102 and 102' which are pivotally connected to levers 103 and 103' of the clutch mechanism. When the levers 103 and 103' are in vertical relation the clutch transmission is out of clutching engagement with the drive shaft 91. Movement of either of the rods 102 and 102' inwardly functions to swing one of the levers so as to connect the clutch mechanism with the shaft 91 for turning the screw in one direction. While movement of either of the rods outwardly functions to swing one of the levers so as to connect the clutch mechanism with the shaft 91 for rotating the screw in the opposite direction. The actuator rods have latching engagement with brackets 104 carried by the side walls 11 and 12 for retaining the rods in the desired set position.

The four way valve 76 is adapted to be manually adjusted for directing the flow through the conduits 74, 74', 75 and 75' for raising or lowering the plow from either side of the spreader by means of actuator rods 106 and 107 connected with the ball head of the valve lever 109. When the valve lever is in vertical relation the valve is closed and when either of the actuator rods 106 and 107 is moved so as to swing the valve lever in one direction, flow through the valve is established so as to raise the plow and when either of the actuator rods is moved so as to swing the valve lever in the opposite direction flow is established for lowering the plow. The said rods have latching engagement with brackets 110 carried by the side walls 11 and 12 for retaining the rods in the desired set position.

Hauling trucks employed in hauling aggregate in roadwork and the like and which deposit the aggregate on the subgrade S in advance of the spreader dump through the bottom or through the rear end. The present construction contemplates that the trucks which dump through the bottom deposit the aggregate in substantially parallel windrows narrower than the spreader and the roadway as indicated by the reference characters A and B, as shown in FIGS. 4 and 5 of the drawings. The windrows A and B are approximately forty inches in width by approximately twenty inches in height and are spaced apart about twenty-four inches. The windrows are spaced inwardly from the outer edges of the subgrade about eighteen inches. When the aggregate is laid in this manner, the plow sections 58 and 59 are disposed in forwardly directed diverging relation and with the forward movement of the spreader function to spread the aggregate inwardly to approximately a height of ten inches over a width of approximately forty-eight inches between the remaining portions of the windrows, as shown in FIG. 6 of the drawings.

When the aggregate is deposited through the rear end of the truck, the present construction provides that the single windrow C is approximately eight feet in width and twelve inches in height, as shown in FIG. 7 of the drawings. For this type of windrow the plow sections are arranged in forwardly directed converging relation and with the forward movement of the spreader function to spread the aggregate to approximately a height of twenty inches at each side and with a layer of approximately six inches in height therebetween extending over a width of fifty-four inches, as shown in FIG. 9 of the drawings. The aggregate, as shown in cross-section in FIGS. 6 and 9 of the drawings, is then engaged by the screw which functions to spread the same laterally between the side walls 11 and 12 and to pile the aggregate against the rear wall 13, as indicated by the reference character D in FIG. 10 of the drawings. This piling up of the aggregate against the rear wall provides a reservoir for the flow thereof under the rear wall 13 and under the foot 52 of the strike-off blade 42. The reservoir of aggregate against the rear wall also permits of the flow thereof through the openings 112 in the side walls 11 and 12 outwardly therebeyond against the side gates 114 which are adjustable for spreading the aggregate the desired width beyond the side walls 11 and 12 respectively. As illustrated in FIG. 2 of the drawings both the rear wall 13 and the strike-off blade 42 include oppositely disposed side portions which extend outwardly and rearwardly in angular relation and which function to spread outwardly the aggregate piled against the rear wall during the forward movement of the spreader.

The gates 114 are swingably connected with the protruding ends of the strike-off grade 42 by hinges 115 and includes hingedly connected sections 116, 117 and 118 which are adapted to be disposed in aligned relation closing the openings 112 and to be adjusted outwardly for varying the distance the aggregate is spread beyond the side walls as shown in FIG. 2 of the drawings. Chains 121 affixed to the sections 118 are releasably linked to the side walls 11 and 12 for securing the gates in set relation. Latches 119 adapted to engage the side walls 11 and 12 are provided for securing the gates in closed relation.

The spreader is moved forwardly over the grade S to effect engagement of the plow with the aggregate laid down in advance thereon, by tractors (not shown) operatively engaging arms 120 and 121 swingably connected with the rear end of the spreader. With the valve 76 of the ram 71 set in a neutral position, and the hinge connections 60, 61 being detached from the brackets 62, the plow sections 58 and 59 may be manually swung to the desired position and binding of the cross bar 66 in the eye 65 avoided by manually moving the studs with the eyes along the cross bar.

While the preferred form of the invention has been shown and described herein, it is to be understood that the same is not so limited but shall cover and include any and all modifications thereof which fall within the purview of the invention.

What is claimed is:

In a spreader for spreading and remixing aggregate arranged in at least one windrow of a width narrower than the spreader and which is laid down in advance thereof, a container, means rollably supporting said container at its forward end, said container having opposite side walls and a rear wall and with an open bottom and an open front between said side walls, said rear wall including oppositely disposed side portions extending outwardly and rearwardly in angular relation, a plow adapted to engage and spread the aggregate forwardly of the container during the forward movement of the spreader, said plow including oppositely disposed plow portions arranged in forwardly directed converging relations and the width between the outer ends of the plow portions when in converging relation being narrower than said container, means carried by said container adjustably supporting said plow adjacent the open front of said container, bracket means carried by said container pivotally mounting said plow portions at their inner ends for horizontal and vertical swinging, said plow portions being supported by said adjustable supporting means for lateral sliding relative thereto at points forwardly of said bracket means whereby said plow portions may be manually swung from converging to diverging relation, a screw, said screw having right and left hand laterally extending screw portions journalled for rotation between said side walls rearwardly of said plow for remixing and spreading the aggregate spread by said plow and for piling the aggregate against said rear wall, power means carried by said container operatively connected with said screw for turning the same, and a strike-off blade carried by and located rearwardly of said rear wall and beneath which the aggregate is discharged from the container with the forward movement of the spreader and which is adjustable with reference to said rear wall for varying the depth of the discharge of the aggregate therebeneath.

(References on following page)

References Cited by the Examiner

UNITED STATES PATENTS

| | | | |
|---|---|---|---|
| 1,534,900 | 4/1925 | Bolin | 37—98 |
| 2,076,890 | 4/1937 | Heltzel | 94—44 |
| 2,169,987 | 8/1939 | Mosel | 94—46 |
| 2,219,159 | 10/1940 | Flynn | 94—44 X |
| 2,645,043 | 7/1953 | Booton | 37—98 |
| 2,888,864 | 6/1959 | Plas | 94—46 |
| 2,911,892 | 11/1959 | Pollitz | 94—46 |
| 2,962,947 | 12/1960 | MacDonald | 94—44 |

JACOB L. NACKENOFF, *Primary Examiner.*